A. L. HATCHER.
COMBINATION CORN AND PEA PLANTER.
APPLICATION FILED AUG. 19, 1919.
1,324,045.
Patented Dec. 9, 1919.
2 SHEETS—SHEET 2.
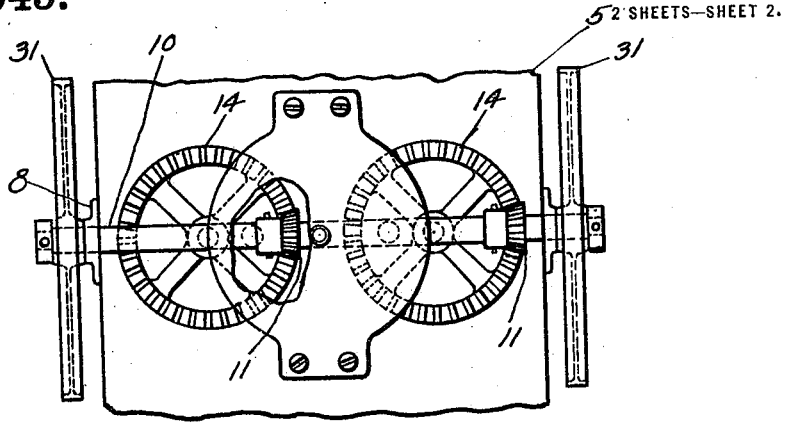
Fig. 2.
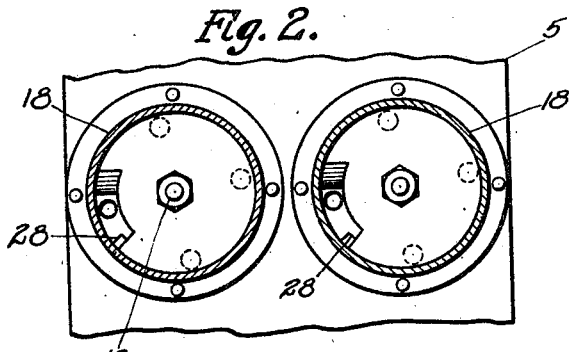
Fig. 3.
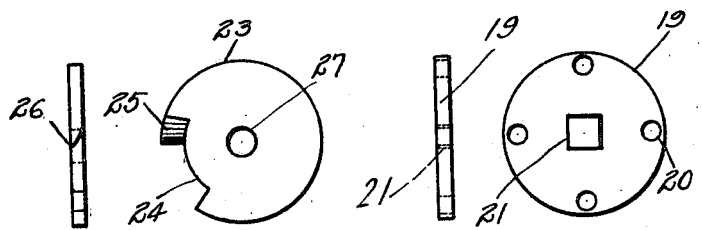
Fig. 4.
Fig. 5.
Witness
Inventor
A. L. Hatcher.
By C. A. Snow & Co.
Attorneys

UNITED STATES PATENT OFFICE.

ABRAHAM L. HATCHER, OF TEXOLA, OKLAHOMA.

COMBINATION CORN AND PEA PLANTER.

1,324,045.      Specification of Letters Patent.      Patented Dec. 9, 1919.

Application filed August 19, 1919. Serial No. 318,576.

*To all whom it may concern:*

Be it known that I, ABRAHAM L. HATCHER, a citizen of the United States, residing at Texola, in the county of Beckham and State of Oklahoma, have invented a new and useful Combination Corn and Pea Planter, of which the following is a specification.

This invention relates to new and useful improvements in agricultural machines, and more particularly to seeding and planting machines.

The primary object of this invention is to provide a device of this kind having a plurality of seed containing hoppers adapted to feed into a common distributer.

A still further object of the invention is to provide valves for controlling the discharge opening of the hoppers, to insure the discharge of the grain at a predetermined period.

With the foregoing and other object in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

Referring now to the drawings:—

Fig. 2 illustrates a bottom plan view of the seeder looking at the same as indicated by the line 2—2 in Fig. 1.

Fig. 3 illustrates a top plan view of the seeder looking at the same from a position as shown by the line 3—3 Fig. 1.

Fig. 4 is a detailed view of the stationary valve member; and

Fig. 5 illustrates a detailed view of the rotary valve member.

Figure 1:
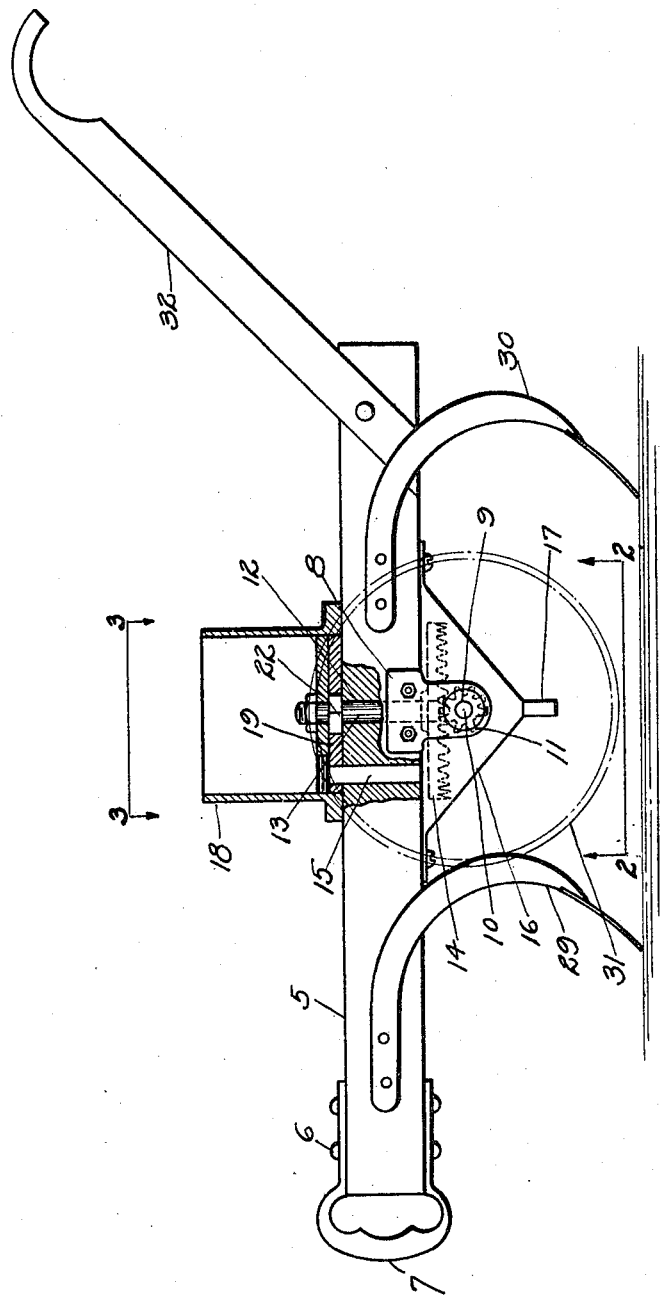
Figure 1 illustrates a side elevational view partly in section of a seeder constructed in accordance with my invention.

Referring now to the drawings in detail, the reference character 5 indicates the combined frame and beam of the seeder, to the forward end of which is secured by bolts 6, the usual clevis 7.

Depending from the frame 5 are the plates 8 which are, as shown apertured at 9 to provide bearings for the axle 10, on which are keyed the beveled pinions 11, for purposes to be hereinafter more fully described.

Extending upwardly through vertically disposed openings 12 are the parallel vertical shafts 13 each of which carries, on one end thereof a relatively large pinion 14 positioned to mesh with the beveled pinions 11, for imparting rotary movement thereto.

Adjacent the shafts 13, and extending through the frame 5 are the vertically disposed discharge openings 15, the lower ends thereof being in communication with a funnel shaped distributing spout 16, the walls of which, as shown terminate in a relatively small discharge pipe 17.

Supported on the frame 5 and disposed directly above the vertical discharge openings 15 are arranged the hoppers 18, which as shown are preferably circular in formation, and have supported adjacent the bottom thereof a rotary valve member 19 having a plurality of openings 20 formed therein, said openings being so constructed that they may be brought into registry with the vertical discharge opening 15, to discharge seed, or other material to said opening 15.

Each of the rotary valves 19 is provided with a central opening 21, which, as shown is preferably square to receive the squared portion 22 of the shaft 13, thereby fixing the same to said shaft in order that the same may have a rotary movement therewith.

Disposed directly above said rotary valve member 19 is a stationary valve member 23 which also is provided with a discharge opening 24, one of the walls of which being inclined as at 25 to provide a knife like edge 26, which in operation coöperates with the openings 20 of the rotary valve member 19 for cutting off the supply of grain to said discharge openings, of members 19.

As clearly shown by Fig. 1 of the drawing the stationary valve 23 is provided with a central opening 27 which embraces the shaft 13 for supporting the same, said valve member being held against rotary movement by engagement with the lug 28 formed integral with the hopper, in which the valve member 23 is supported.

To the forward part of the beam 5, is secured the furrow-opener 29, which is also in front of the discharge tube 17, in order that the discharge tube 17 may deposit the seed directly in the furrow.

To the rear of the discharge tube 17, and secured to the frame of the seeder is the furrow coverer 30, which is supported with such relation with the discharge pipe 17 that the same covers the furrow after a quantity of seed has been deposited therein.

As shown, the frame is supported by wheels 31, which are keyed to the shaft or axle 10, in order that rotary movement of the wheels 31 will be imparted to the beveled pinions 11.

In connection with the frame I have also shown handles 32, disposed at the rear thereof.

The operation of the device is as follows:—

In the event that it is desired to plant peas and corn, the hoppers 18 are filled with their respective grains, and the machine drawn across the plowed field, to be planted, with the result that axle 10 is revolved, thereby imparting rotary movement to the valve members 19, through the pinions 11, and 14. It will therefore be seen that when the valve members 19 rotate under the stationary valve members 23, the openings 20 thereof pick up a quantity of grain, and when said valve members 19 pass a point to bring the openings 20 into registry with the discharge openings 15, it will be seen that the knife like edges 26 cause the openings 22 to close, and deposit grain into the discharge openings 15, from where it passes to the funnel shaped distributing spout 16, and into the discharge spout 17, to the furrow formed by the furrow forming member 29.

Having thus described my invention, what I claim is:—

In a seeder, a frame having discharge openings extending therethrough, a hopper positioned above each of the openings, valve members mounted within each of the hoppers, each of the valve members including a rotary disk and a stationary disk, each of said disks, having an opening, the opening in one of said disks being relatively long, a knife-like edge forming one of the walls of the relatively long opening, means for securing the stationary disk against rotation, and means for rotating the rotary disk to deliver material through the discharge openings.

In testimony that I claim the foregoing as my own, I have hereto affixed my signature in the presence of two witnesses.

ABRAHAM L. HATCHER.

Witnesses:
  IRA SPUD,
  J. D. RUTHERFORD.